J. H. BEAM.
Corn Harvester.
No. 89,968. Patented May 11, 1869.
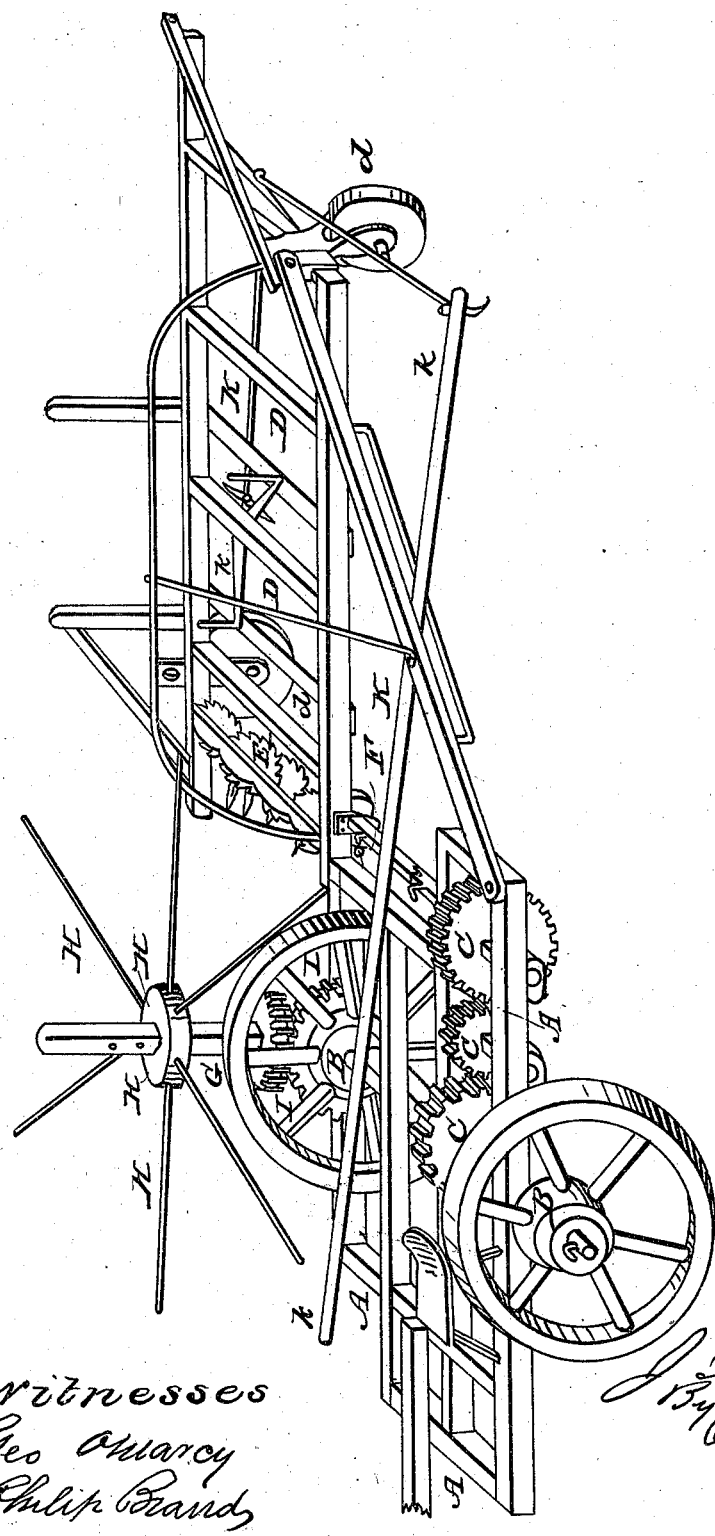
Witnesses
Geo O'Marcy
Philip Brand
Inventor
J. H. Beam
By Cimm & Marcy
Attorneys

JACOB H. BEAM, OF WOODSIDE, ILLINOIS.

*Letters Patent No. 89,968, dated May 11, 1869.*

IMPROVEMENT IN CORN-HARVESTERS.

The Schedule referred to in these Letters Patent and making part of the same.

Be it known that I, JACOB H. BEAM, of Woodside, Sangamon county, State of Illinois, have invented a new and useful Machine for Cutting and Harvesting Corn; and I do hereby declare that the following is a full, exact, and true description of the construction and operation of the same, reference being had to the accompanying drawings, and to the letters of reference marked thereon.

The nature of my invention consists in constructing a machine by which the stalks of corn are cut below the ear, and thrown back upon a receiving-platform, and from there dumped upon the ground at any desired place.

I construct a square, firm frame, A, over the revolving axle, B, and place the driver's seat on the left side of said frame, near the left wheel.

Underneath the driver's seat, and encircling the revolving axle B, is the cog-wheel C, connected with another cog-wheel, directly in the rear, by means of a smaller one between.

Another frame, D, oblong in shape, supported on swivel-wheels *d d*, is attached, by its left front corner, to the right rear corner of the frame A, its left side extending rearward, on a line with the right side of the frame A.

I call this oblong frame D the receiving-platform, and arrange, in the front of it, the row of circular saws E E E, which are made to revolve by means of a cog-device, underneath the left-hand saw, which is connected with the tumble-shaft F, operated by the three cogs C *c c*, put in motion by the revolution of the axle B.

On the side of the frame A nearest the receiving-platform, and outside of the right wheel, is an upright shaft, G, near the top of which the reel H is attached.

This shaft and reel are made to revolve by the friction of the wheel upon the cog I, at the base of the shaft G, or by the operation of another cog on the wheel, in connection with the cog I.

The situation of this reel allows its revolution to be over the front of the circular saws E.

K is a lever-device, operated by the driver, from his seat, by which the receiving-platform is cleared of its load whenever desired.

The operation of this machine is as follows:

It being drawn through a field of standing corn, the revolving cutter-saws E first being adjusted to cut the stalk, at any desired distance from the ground, by means of the device by which the receiving-platform D is attached to the frame A. The revolving axle B causes the cogs C *c c* to revolve, which communicates a vibratory motion to the tumble-shaft F, which operates upon the cog-device underneath the saws E, which puts them in motion. At the same time, the upright shaft G, with its reel H attached, is put in motion, and as fast as the stalks of corn are cut, the reel throws them back upon the receiving-platform, and the lever-device K dumps them.

Now, what I claim as my invention, and desire to secure by Letters Patent, is—

1. A corn-harvester, constructed and arranged with the frame A, revolving axle B, cogs C *c c*, receiving-platform D, revolving saws E, tumble-shaft F, upright shaft G, reel H, cogs I, and lever-device K, substantially as herein described, and for the purposes set forth.

2. Also, the lever-device K, as arranged and applied to corn-harvesters, in the manner described.

J. H. BEAM.

Witnesses:
GEO. O. MARCY,
C. G. DORWIN.